Dec. 4, 1956  A. L. JUDSON  2,772,570
GYROSCOPE

Filed Dec. 7, 1953  2 Sheets-Sheet 1

INVENTOR.
Albert L. Judson
BY
AGENT

Dec. 4, 1956  A. L. JUDSON  2,772,570
GYROSCOPE

Filed Dec. 7, 1953  2 Sheets-Sheet 2

INVENTOR.
Albert L. Judson
BY

AGENT

United States Patent Office 2,772,570
Patented Dec. 4, 1956

2,772,570

GYROSCOPE

Albert L. Judson, Portland, Oreg., assignor to Iron Fireman Manufacturing Company, Portland, Oreg.

Application December 7, 1953, Serial No. 396,433

6 Claims. (Cl. 74—5.43)

This invention relates generally to gyroscopes and more particularly to gyroscopes having normally vertical spin axes and commonly called gyro verticals.

A gyro vertical adapted for any of the many well known uses to which it may be put is used on the supposition that the spin axis of its rotor is maintained in a substantially gravity vertical position even though the frame in which it is mounted for three degrees of freedom may take any position relative thereto. However, due to the summation of many uncontrollable forces well known in the art which continuously act on the gyroscope, the rotor in its cardan suspension of inner and outer gimbal rings is continuously subject to precessional movements of its spin axis away from the vertical. Therefor it is essential that a gyro vertical be equipped with mechanism adapted to sense the displacement and the direction of the displacement of the spin axis away from the vertical, and also be equipped with means controlled by the displacement sensing means for causing the gyroscope to precess to bring its spin axis continuously back to its desired vertical position.

Specifically this invention provides a novel and useful means for continuously sensing the displacement of the rotor spin axis away from the vertical together with novel and useful means controlled by the sensing means for cuasing the rotor spin axis continuously to be precessed toward its true gravity vertical position and means operative when desired to render the precessing means ineffective to affect the position of the spin axis.

It is well known in the art to use air jet arrangements to provide the precessing forces controlled to cause the spin axis of a gyro vertical to return towards its desired vertical position after displacement therefrom and also to provide means by which the energy of the spinning rotor is used to activate the air jets. Again it is well known in the art to sense the displacement of the rotor spin axis from its gravity vertical position by gravitationally controlled pendulums which in turn control the balance of air jet forces to the desired end.

The present invention provides novel means of unexpected effectiveness in air erection and controlling apparatus of this type and this is its primary object.

A second object is to provide a gyro vertical with air erection means and control means therefor which are simple, rugged and inexpensive without the sacrifice of sensitivity.

How these and other objects are attained is made clear in the following description referring to the attached drawings in which Fig. 1 is an elementary view in perspective of a gyro vertical and its axes of freedom.

Like numerals of reference refer to like parts in the several figuures of the drawings.

Figure 1:
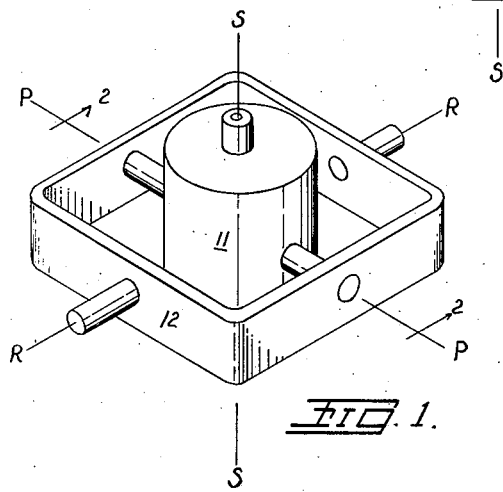

Referring now to the drawings in Fig. 1 is shown generally a gyro vertical having a housing 11 in which its rotor is supported for spinning about a vertical axis S—S. Housing 11 forms the inner gimbal ring of the gyroscope system and is carried in outer gimbal ring 12 freely to rotate about the axis P—P. Outer gimbal ring 12 is carried on a supporting frame (not shown) freely to rotate about the axis R—R. If the gyro vertical is used in an airplane the supporting frame will usually be secured to the plane to take whatever position the plane takes.

Figure 2:
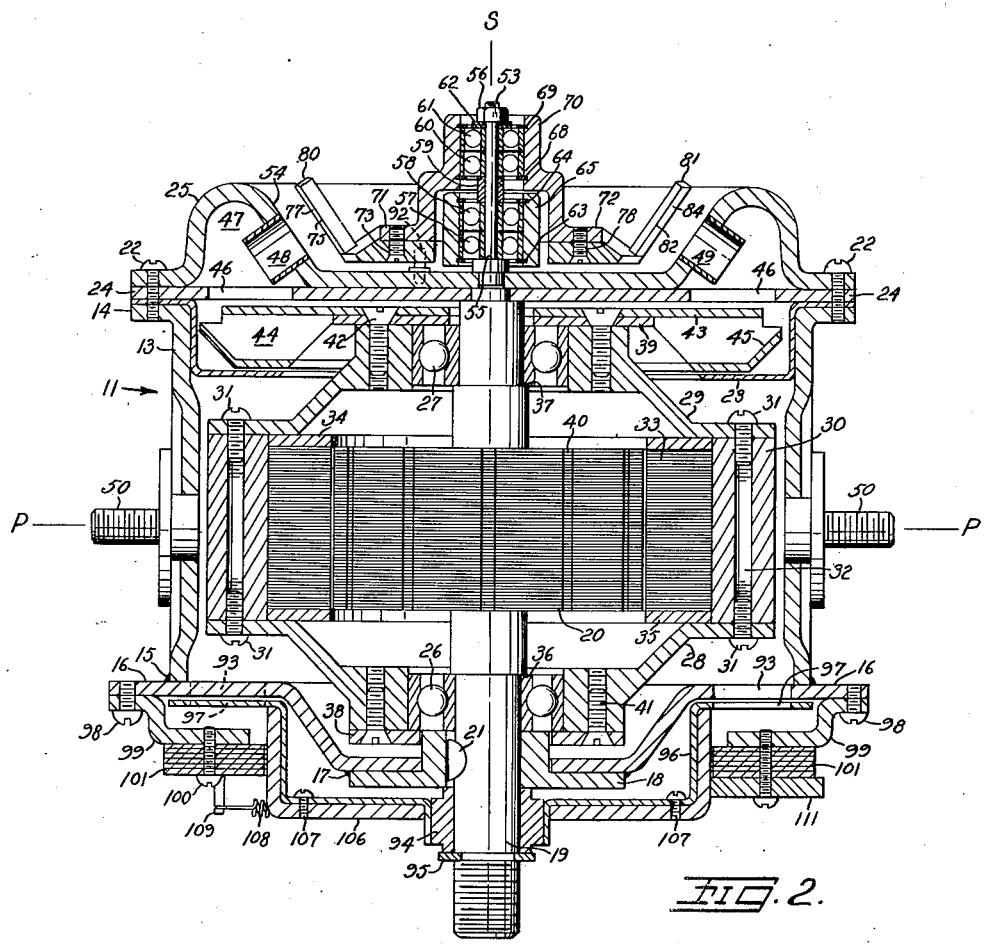
Fig. 2 is a partial sectional view of the gyro vertical of this invention in a plane including the S and P axes of Fig. 1 and viewed in the direction 2—2 of Fig. 1.

The gyro vertical of this invention as shown in Fig. 2 has an inner gimbal ring or housing 11 having a barrel 13 of generally cylindrical shape on which is formed an upper end flange 14 and to which is welded as at 15 lower end bell 16 having a central hole therethrough in which is secured as by welding 17 a flanged boss 18 adapted to support and closely fit stationary mounting shaft 19 of the wound stator 20 of the electric driving motor of the gyroscope rotor. In the figure the windings have been omitted from slots 40 of the stator field lamination stack 20 to avoid the unnecessary crowding of the figure. Shaft 19 is prevented from turning in boss 18 by Woodruff key 21.

Bearing mounting studs 50 secured to diametrically opposite sides of barrel 13 are adapted for mounting the bearings (not shown) required for mounting housing 11 in outer gimbal ring 12 on the P axis as shown in Fig. 1.

Stacked on the barrel 13 and secured on flange 14 by screws 22 are air deflecting baffle 23 guiding plate 24 for the upper end shaft 19 and cover 25.

Rotatably carried on shaft 19 through ball bearings 26 and 27 are end plate elements 28 and 29 respectively of the gyroscope rotor with the inertia element 30 of the rotor secured between elements 28 and 29 by screws 31 threaded into holes 32 in element 30. Secured within inertia element 30 between end plates 28, 29 are the electrical elements of the rotor comprising the field lamination stack 33 through which the induced current bar windings (not shown) are skewed and short circuited at their upper and lower ends respectively by end rings 34 and 35.

The inner races of ball bearings 26, 27 are spaced along shaft 19 by shaft shoulders 36, 37 while the outer races of bearings 26, 27 are secured within end plate elements 28, 29 by bearings retainer washers 38, 39 held in place by screws 41, 42 respectively. Also secured to end plate 29 by screws 42 is an air pressure generating centrifugal fan having a back plate 43, blades 44, and blade shroud 45.

Figure 3:
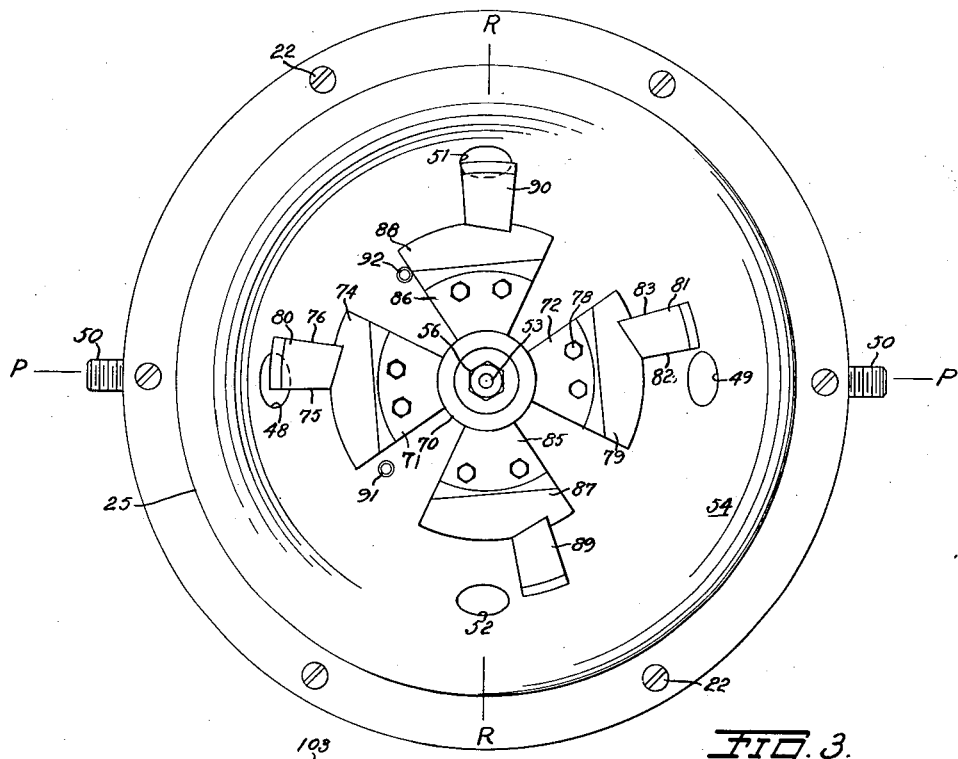
Fig. 3 is a plan view of the device of Fig. 2.

Referring now to Figures 2 and 3 it is seen that guide plate 24 is perforated with an annular ring of holes 46 for the purpose of admitting air under pressure from fan blades 44 to annular plenum chamber 47 formed in the under side of cover 25 and that two pairs of air jet tubes 48, 49 and 51, 52 are secured into and penetrate the inner sloping wall 54 of plenum chamber 47. This arrangement should be carefully noted for it is in the air jet erection means now to be described that the essence of my invention lies.

Air jet tubes 48, 49 are symmetrically placed on either side of spin axis S with their axes at similar angles of about forty-five degrees to either the horizontal or vertical and in a plane including the S axis and the P axis. Similarly air jet tubes 51, 52 are symmetrically placed on either side of axis S with their axes at similar angles of about forty-five degrees to either the horizontal or vertical and in a plane including the S axis and the R axis.

Secured into cover 25 and axially aligned with the spin axis S is a shouldered shaft 53. Secured on shaft 53 between shoulder 55 and nut 56 threaded onto the opposite end of shaft 53 are the inner races of a pair of precision instrument grade ball bearings 57, 58, a spacer 59, the inner races of a second pair of precision instrument grade ball bearings 60, 61 and a washer 62. The outer races of bearings 57, 58 are secured by snap rings 63, 64 into hub 65 having arms 85, 86 extending oppositely therefrom. The outer races of bearings 60, 61 are secured by snap rings 68, 69 into umbrella hub 70 having arms 71, 72 extending oppositely therefrom.

Secured to hub arm 71 by screws 73 is jet control member 74 the blade 80 of which has a thin edge 75, a thick edge 76 and a back face 77, spaced from and substantially parallel to inner conical sloping wall 54 of cover 25. Similarly secured to hub arm 72 of hub 70 by screws 78 is jet control member 79 the blade 81 of which has a thin edge 82, a thick edge 83 and a back face 84 spaced from and substantially parallel to inner sloping wall 54 of cover 25. Blades 80 and 81 are of opposite hand so that in Fig. 2 edges 75 and 82 point upwardly out of the surface of the drawing or in Fig. 3 edges 75 and 82 point downwardly towards the bottom of the drawing. Also the thin edges 75 and 82 are offset slightly in the same direction from the centerline of hub 70, arms 71, 72 and members 74, 79, so that when the centerline is in the plane which includes the axes S and P and the axes of jet tubes 48, 49, slightly less than half of each of the jet tubes 48, 49 are covered by blades 80 and 81 respectively. When hub 70 with blades 80 and 81 are rotated either to the left or right about the S axis, blade 80 will cover more or less of jet tube 48 and conversely blade 81 will cover less or more of jet tube 49 as the case may be.

When jet tubes 48 and 49 are equally covered by blades 80 and 81 each of the tubes will emit the same amount of air from constant pressure air plenum chamber 47 and their reaction forces tending to rotate housing 11 about the R axis in the direction opposite from the emission directions of the jets will balance. However, when jet tubes 48 and 49 are unequally covered by blades 80 and 81 the least covered tube will emit a greater amount of air and therefore will have a greater reaction with a resulting net reaction force tending to rotate the housing about the R axis in the direction of the jet tube with the greater opening. This net reaction in the characteristic way of gyroscopes will result in a precessional rotation of the housing about the R axis.

To make use of this gyroscope characteristic to erect the housing about the P axis one of the members 74, 79 is made of a heavier metal than the other so that hub 70 with attached members 74, 79 will be gravitationally influenced to rotate in incremental amounts about the spin axis as the spin axis departs from the gravity vertical. Thus hub 70 with attached members 74, 79 of unequal weight is a horizontally swinging pendulum operated by a vertical gravitational force having a component in a plane normal to the S axis when the S axis departs from the vertical. Which of the members 74, 79 is made the heavier will depend on the direction of spin of the rotor in order that the unbalanced jet reaction will tend to restore by precession the S axis to its desired vertical position about the P axis.

Similarly hub 65 with arms 85, 86, to which are attached jet control members 87, 88 having blades 89, 90 are adapted to cooperate with jets 52, 51, respectively continuously to erect housing 11 about the R axis when the S axis is displaced thereabout.

Bumper pins 91, 92, located as shown in Fig. 3 and secured into cover 25 restrict the swings of each of the pendulum systems to their useful limits.

While there have been many efforts made to devise a pendulum controlled air erection means for a gyro vertical, and many are shown in prior art patents, there have been difficulties of precise operation with those known to applicant. In the present invention these previous difficulties have been overcome by the compact association of applicant's pendulum elements, with their relatively small size and frictionless mounting, together with the angular positioning of the air jets which not only makes possible the pendulum arrangement but gives to the air jets the maximum possible reaction force lever arm length from their respective torque axes, R or P, even though the jets themselves are relatively close to the S axis. It is understood of course that in the design shown the axes of the air jets are at an angle of about forty-five degrees to the S axis but that the design is not limited to any precise angle since in other sizes and designs of gyro verticals angles over a range of twenty to seventy degrees from the S axis have been considered satisfactory for the purpose in mind.

Figure 4:
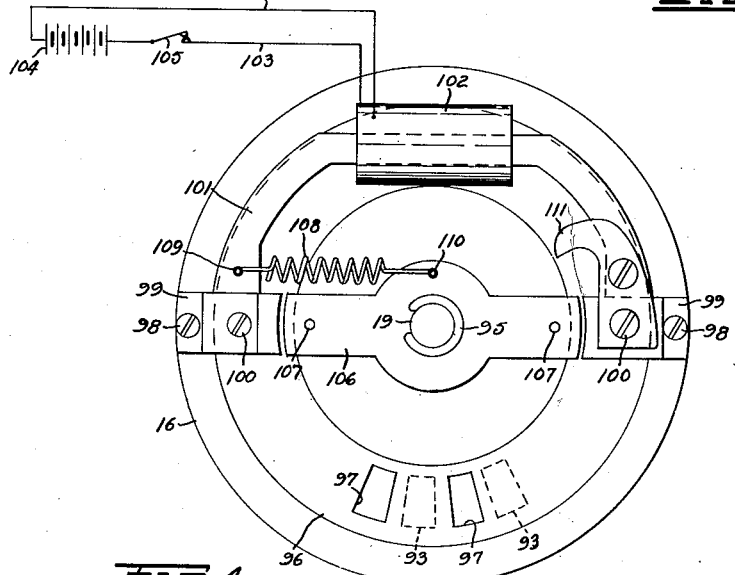
Fig. 4 is an upward view from underneath the device of Fig. 2.

Now referring to Figures 2 and 4 of the drawings it is seen that lower end bell 16 of housing 11 is perforated with an annular ring of holes 93 through which air is drawn from the outside of housing 11 to the interior thereof, up through the annular space between the inside of barrel 13 and the outside of rotor inertia element 30, inwardly through the space between rotor end plate 29 and baffle 23 to the inner ends of shrouded fan blades 44, outwardly through blades 44 and discharging from the outer tips of blades 44 through the annular ring of holes 46 in plate 24 into plenum chamber 47, from where the air is jetted to the outside of housing 11 through air jets 48, 49, 51, and 52.

Sometimes it is desirable to allow the gyro vertical to operate freely without the supervision of the air erection system. The usual way to accomplish this is to stop the circulation of air through casing 11 and many ways of dampering the air path through the housing have been used by others. However for the gyro vertical of this invention there has been provided what is believed to be a simple, foolproof and low cost structure for stopping at will the air flow through the system and this structure is thought to be a unique and useful element of the invention.

Bearing 94 sized and positioned to be freely rotatable about shaft 19 between flanged boss 18 and C-ring 95 set into shaft 19 as shown is secured into a central flanged opening in shutter cup 96 which is perforated with an annular ring of holes 97 which at one angular position of cup 96 register with holes 93 in lower end bell 16 of housing 11 and therefore permit a free passage of air from the outside to the inside of the housing. Secured by screws 98 to opposite sides of lower end bell 16 are clips 99 to which are secured by screws 100 the ends of semicircular magnetizable lamination stack 101 on which it wound electric wire coil 102 with leads 103 adapted to be connected as shown to electric source 104 by remote switch 105. Armature strap 106 enlarged at its midposition has a central hole therethrough allowing strap 106 to be slipped over the central flange of shutter cup 96 to which it is secured by screws 107. Tension spring 108 anchored at one end to pin 109 secured to lamination stack 101 and at the other to pin 110 secured to strap 106 urges strap 106 to rotate counter clockwise as viewed in Fig. 4 until the travel of strap 106 is limited by striking hook 111 at which position holes 97 in cup 96 are in register with holes 93 in end bell 93 as shown in Fig. 2. When switch 105 is closed as shown in Fig. 4 coil 102 is energized, a magnetic flux circuit is set up through stack 101 and strap 106 which causes strap 106 to overcome the bias of spring 108 and move into alignment with the ends of stack 101, the position shown in Fig. 4 and in which position holes 97 are out of register with holes 93 so that all air circulation through housing 11 is prevented thus rendering the air erection system of the gyro vertical inoperative.

Having thus pointed out some of the objects of this invention, illustrated and described a preferred structure by which the invention is practiced and explained its operation, I claim:

1. A gyroscope system of the type having a housing adapted to form an inner gimbal ring for the system, a rotor journalled in said housing to spin about a normally gravity vertical first axis, an outer gimbal ring in which said housing is journalled freely to rotate about a second axis normal to said first axis and a frame in which said outer gimbal ring is journalled freely to rotate about a third axis normal to said second axis whereby the rotor of said system has three degrees of freedom, together with air erection means carried by said housing and adapted continuously to precess said first axis towards its normal gravity vertical position when displaced therefrom, said air erection means comprising means adapted to maintain a supply of air under pressure in said housing, a first pair of air jets, a second pair of air jets, each of said jets being adapted to emit air at the same rate when all of said jets are unrestricted, the jets of said first pair being located diametrically opposite with respect to said first axis with their axis set at equal angles of between twenty and seventy degrees to said first axis in a plane including said first axis and said second axis, the jets of said second pair being located diametrically opposite with respect to said first axis with their axes set at equal angles of between twenty and seventy degrees to said first axis in a plane including said first axis and said third axis, and a pair of pendulum means each independently freely rotatable about said first axis, one of said pair of pendulum means being adapted to cooperate with said first pair of air jets proportionately to unbalance the air emitted by the jets of said first pair as said first axis departs about said second axis from its normally vertical position, and the other of said pair of pendulum means being adapted to cooperate with said second pair of air jets proportionately to unbalance the air emitted by the jets of said second pair as said first axis departs about said third axis from its normally vertical position.

2. The gyroscope system of claim 1 in which the axes of all of said air jets are inclined to said first axis at the same angle of approximately forty-five degrees.

3. The gyroscope system of claim 1 in which each of said pendulum means of said pair of pendulum means comprises a body part, a pair of air jet intercepting blade parts, and means adapted to support said body part freely to rotate about said first axis, said pair of blade parts being formed in mirror symmetry and secured one to one end of said body part and the other to the other end of said body part, one of said blades of said pair being formed with a conical face normal to and opposed to one of the jets of one of said pair of air jets and spaced axially thereof, the other of said blades of said pair being formed with a conical face normal to and opposed to the other of the jets of said pair of air jets and spaced axially thereof, each of said blades being formed with a thin edge, the thin edges of said pair of blades being rotatable with said body part into a plane slightly spaced from and parallel to a plane including said first axis and one of said second or third axes where both said blades will be spaced from said plane including said first axis and said one of said second or third axes.

4. The gyroscope system of claim 1 in which said means adapted to maintain a supply of air under pressure in said housing comprises means adapted to admit air into said housing and a fan secured to said rotor to rotate therewith.

5. The gyroscope system of claim 4 in which said means adapted to admit air into said housing comprises an end bell for said housing, said end bell being formed with an annular plane surface normal to said first axis, said plane surface being perforated with an annular ring of spaced holes concentric with said first axis, a shutter member outside said housing, means mounting said shutter member for rotation about said first axis, said shutter member being formed with an annular plane surface adjacent said plane surface of said end bell of said housing, said plane surface of said shutter member being perforated with an annular ring of spaced holes adapted to register with said spaced holes in said end bell, and means adapted to bias said shutter towards registration of said spaced holes in said shutter with said spaced holes in said end bell.

6. The gyroscope system of claim 5 including magnetic means carried on said housing adapted when energized to overcome the bias of said biasing means to move said holes in said shutter out of register with said holes in said end bell and means remote from said housing for energizing said magnetic means.

References Cited in the file of this patent
UNITED STATES PATENTS

| 1,324,482 | Titlerington | Dec. 9, 1919 |
| 2,207,717 | Carter | July 16, 1940 |
| 2,368,058 | Whatley | Jan. 23, 1945 |